US009810941B2

(12) United States Patent
Huang

(10) Patent No.: US 9,810,941 B2
(45) Date of Patent: Nov. 7, 2017

(54) TRANSFLECTIVE LIQUID CRYSTAL DISPLAY PANEL

(71) Applicant: Chunghwa Picture Tubes, LTD., Taoyuan (TW)

(72) Inventor: Jiun-Jr Huang, Yilan County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 26 days.

(21) Appl. No.: 15/011,448

(22) Filed: Jan. 29, 2016

(65) Prior Publication Data

US 2017/0168350 A1   Jun. 15, 2017

(30) Foreign Application Priority Data

Dec. 11, 2015   (CN) .......................... 2015 1 0917082

(51) Int. Cl.
*G02F 1/1335*   (2006.01)

(52) U.S. Cl.
CPC .. *G02F 1/133555* (2013.01); *G02F 1/133504* (2013.01); *G02F 1/133514* (2013.01)

(58) Field of Classification Search
CPC ..................... G02F 1/133555; G02F 1/133514
See application file for complete search history.

(56) References Cited

U.S. PATENT DOCUMENTS 5,521,726 A * 5/1996 Zimmerman ........ G02B 5/3025
349/159
6,927,817 B2    8/2005 Itoh et al.
2003/0016321 A1*  1/2003 Takizawa .......... G02F 1/133555
349/113
2003/0071942 A1*  4/2003 Kojima .................. G02B 5/201
349/106
2004/0201804 A1* 10/2004 Ting .................. G02F 1/133514
349/114
2007/0008464 A1*  1/2007 Yamaguchi ....... G02F 1/133504
349/112
2012/0287380 A1* 11/2012 Hagiwara .............. G02B 5/201
349/97
2013/0107182 A1*  5/2013 Hagiwara ......... G02F 1/133555
349/110
2013/0107282 A1*  5/2013 Kim .................... G03G 21/1633
358/1.1

(Continued)

FOREIGN PATENT DOCUMENTS

TW      594318      6/2004
TW     I460864     11/2014

*Primary Examiner* — Sang V Nguyen
(74) *Attorney, Agent, or Firm* — JCIPRNET

(57) ABSTRACT

A transflective LCD panel includes a pixel array substrate, an opposite substrate, and a liquid crystal layer disposed between the pixel array substrate and the opposite substrate. The pixel array substrate includes a first substrate, pixel units, and reflective layers. Each pixel unit has a transmissive region and a reflective region, and the reflective layers are disposed in the reflective region. The opposite substrate is disposed above the pixel array substrate and includes a second substrate, a color filter layer, and light scattering layers. A thickness of the color filter layer is greater than a thickness of each light scattering layer. A first bottom surface of the color filter layer is aligned to a second bottom surface of each light scattering layer. The light scattering layers correspond to the reflective layers.

9 Claims, 1 Drawing Sheet

(56) References Cited

U.S. PATENT DOCUMENTS

| | | | |
|---|---|---|---|
| 2014/0192294 A1* | 7/2014 | Chen | F21V 9/08 |
| | | | 349/69 |
| 2014/0252382 A1* | 9/2014 | Hashimoto | H01L 33/504 |
| | | | 257/88 |
| 2014/0253843 A1* | 9/2014 | Kanno | G02B 5/0242 |
| | | | 349/62 |
| 2016/0195647 A1* | 7/2016 | Woo | G02B 5/0236 |
| | | | 362/84 |

* cited by examiner

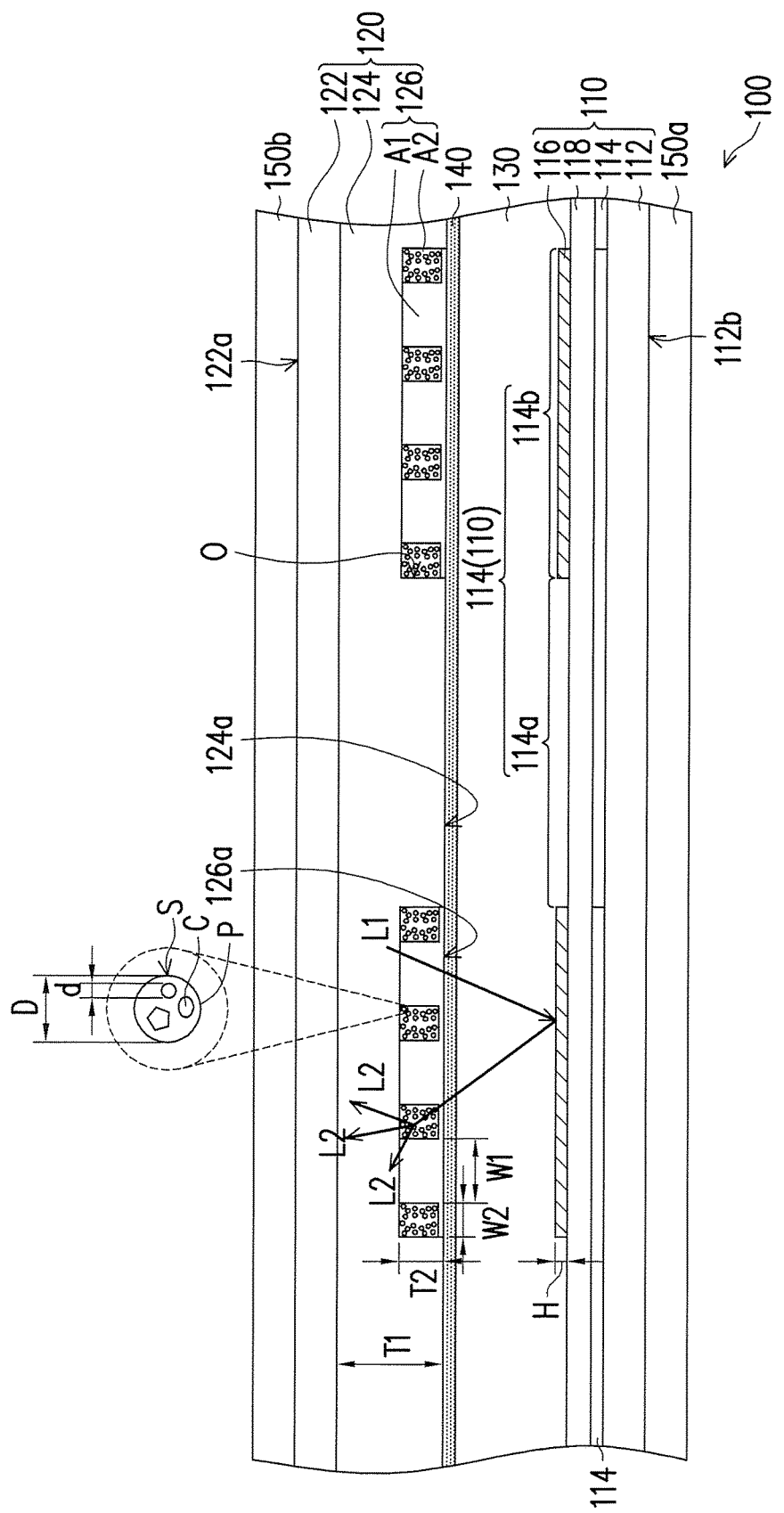

TRANSFLECTIVE LIQUID CRYSTAL DISPLAY PANEL

CROSS-REFERENCE TO RELATED APPLICATION

This application claims the priority benefit of China application serial no. 201510917082.0, filed on Dec. 11, 2015. The entirety of the above-mentioned patent application is hereby incorporated by reference herein and made a part of this specification.

FIELD OF INVENTION

The invention relates to a liquid crystal display (LCD) panel, and more particularly, to a transflective LCD panel.

DESCRIPTION OF RELATED ART

A transflective LCD panel can perform a display function by simultaneously applying a back light source and an external light source. In general, the transflective LCD panel includes a pixel array substrate, an opposite substrate, and a liquid crystal layer disposed therebetween. Pixel units on the pixel array substrate have transmissive regions and reflective regions. Transparent pixel electrodes are disposed in the transmissive regions, and reflective pixel electrodes are disposed in the reflective regions. In general, the transflective LCD panel can be categorized into a single cell gap transflective LCD panel and a dual cell gap transflective LCD panel. Fabrication of the dual cell gap transflective LCD panel is complicated and expensive; by contrast, in the single cell gap transflective LCD panel, a voltage-transmittance (V-T) curve of the reflective regions does not match a V-T curve of the transmissive regions.

Another technical issue of the transflective LCD panel is the fabrication and formation of a metal reflective layer. The planar metal reflective layer is formed in the reflective regions, which easily reduces the light utilization rate of scattered lights and leads to mirror effects if users directly face and look at the transflective LCD panel. Therefore, in the pertinent field, the attention has always been drawn to the roughening process performed on the surface of the metal reflective layer. At present, it is common to place a transparent organic photoresist onto the pixel array substrate to increase the height of the reflective regions, a micro bump structure is formed in the transflective LCD panel at approximately half the height of the liquid crystal layer through performing a lithographic process, and the metal reflective layer is coated onto the micro bump structure. The micro bump structure roughens the surface of the metal reflective layer, lessens the mirror effects during reflection, and increases the utilization rate of reflected light scattered at a large angle; thereby, the overall reflection rate of the transflective LCD panel can be improved. However, it is difficult to shape a concave-convex metal reflective layer, and an issue of poor alignment may accordingly arise.

SUMMARY OF THE INVENTION

The invention is directed to a transflective LCD panel that is able to enhance the overall light utilization rate and is characterized by favorable optical performance.

In an embodiment of the invention, a transflective LCD panel includes a pixel array substrate, an opposite substrate, and a liquid crystal layer. The pixel array substrate includes a first substrate, a plurality of pixel units, and a plurality of reflective layers. The pixel units and the reflective layers are disposed on the first substrate. Each of the pixel units has a transmissive region and a reflective region, and the reflective layers are disposed in the reflective region. The opposite substrate is disposed above the pixel array substrate and includes a second substrate, a color filter layer, and a plurality of light scattering layers. The color filter layer and the light scattering layers are disposed on the second substrate and face the pixel units. A thickness of the color filter layer is greater than a thickness of each of the light scattering layers. A first bottom surface of the color filter layer is aligned to a second bottom surface of each of the light scattering layers. The light scattering layers correspond to the reflective layers. The liquid crystal layer is disposed between the pixel array substrate and the opposite substrate.

According to an embodiment of the invention, the pixel array substrate further includes an insulation layer disposed between the first substrate and the reflective layers and between the first substrate and the liquid crystal layer.

According to an embodiment of the invention, the transflective LCD panel further includes an optical adhesive layer disposed between the color filter layer and the liquid crystal layer and between the light scattering layers and the liquid crystal layer.

According to an embodiment of the invention, an orthogonal projection of each of the light scattering layers on the first substrate and an orthogonal projection of each of the reflective layers on the first substrate are completely overlapped.

According to an embodiment of the invention, the thickness of the color filter layer is at least twice the thickness of each of the light scattering layers.

According to an embodiment of the invention, each of the light scattering layers has a plurality of first regions and a plurality of second regions, and the first regions and the second regions are alternately arranged. Reflective particles are doped in each of the second regions, and a distribution ratio of the reflective particles in each of the second regions is within a range from 5% to 50%.

According to an embodiment of the invention, a ratio of a width of each of the first regions to a width of each of the second regions is within a range from 0.1 to 20.

According to an embodiment of the invention, each of the reflective particles is a spherical resin particle, a spherical metal particle, or a particle made of an organic-inorganic composite material.

According to an embodiment of the invention, a diameter of each of the reflective particles is within a range from 0.1 µm to 50 µm, a surface of each of the reflective particles has a plurality of recess patterns, and a diameter of each of the recess patterns is within a range from 0.01 µm to 5 µm.

According to an embodiment of the invention, the transflective LCD panel further includes a first polarizer and a second polarizer. The first polarizer is disposed on a bottom surface of the first substrate away from the liquid crystal layer. The second polarizer is disposed on a top surface of the second substrate away from the liquid crystal layer.

In view of the above, the light scattering layers provided herein replace the existing concave-convex metal reflective layer. Here, the light scattering layers are disposed on the second substrate of the opposite substrate, the second bottom surface of each of the light scattering layers is aligned to the first bottom surface of the color filter layer, and the light scattering layers correspond to the reflective layers. Hence, the transflective LCD panel provided herein is a dual cell gap transflective LCD panel. The arrangement of the light scattering layers allows the light to be scattered in a specific direction; thereby, the reflective layers provided herein can be planarized and do not achieve the mirror effect during reflection, the utilization rate of the reflected light scattered at a large angle can be increased, the reflective efficiency of the transflective LCD panel can be improved, and the transflective LCD panel provided herein can have favorable optical performance.

To make the above features and advantages of the invention more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 1 is a schematic partial cross-sectional view of a transflective LCD panel according to an embodiment of the invention.

DETAILED DESCRIPTIONS OF EMBODIMENTS

FIG. 1 is a schematic partial cross-sectional view of a transflective LCD panel according to an embodiment of the invention. For illustrative purposes, two pixel units are schematically depicted in FIG. 1. With reference to FIG. 1, in the present embodiment, a transflective LCD panel 100 includes a pixel array substrate 110, an opposite substrate 120, and a liquid crystal layer 130. The pixel array substrate 110 includes a first substrate 112, a plurality of pixel units 114, and a plurality of reflective layers 116. The pixel units 114 and the reflective layers 116 are disposed on the first substrate 112. Each of the pixel units 114 has a transmissive region 114a and a reflective region 114b, and the reflective layers 116 are disposed in the reflective region 114b. The opposite substrate 120 is disposed above the pixel array substrate 110 and includes a second substrate 122, a color filter layer 124, and a plurality of light scattering layers 126. The color filter layer 124 and the light scattering layers 126 are disposed on the second substrate 122 and face the pixel units 114. A thickness T1 of the color filter layer 124 is greater than a thickness T2 of each of the light scattering layers 126. A first bottom surface 124a of the color filter layer 124 is aligned to a second bottom surface 126a of each of the light scattering layers 126. The light scattering layers 126 correspond to the reflective layers 116. The liquid crystal layer 130 is disposed between the pixel array substrate 110 and the opposite substrate 120.

Specifically, each of the pixel units 114 in the pixel array substrate 110 provided herein is composed of at least an active device (not shown) and a pixel electrode (not shown). Besides, in the present embodiment, the pixel array substrate 110 further includes an insulation layer 118 disposed between the first substrate 112 and the reflective layers 116 and between the first substrate 112 and the liquid crystal layer 130. Particularly, the insulation layer 118 is located above the pixel units 114, so as to planarize the pixel units 114 for subsequently arranging other devices on the pixel units 114. The reflective layers 116 are located in the reflective regions 114b of the pixel units 114; particularly, the reflective layers 116 are arranged on the insulation layer 118. Hence, as shown in FIG. 1, there is a height difference H between the reflective layers 116 and the insulation layer 118.

The color filter layer 124 of the opposite substrate 120 has a plurality of openings O which do not penetrate the color filter layer 124, and the light scattering layers 126 are located in the openings O. The first bottom surface 124a of the color filter layer 124 is aligned to the second bottom surface 126a of each of the light scattering layers 126, and the light scattering layers 126 correspond to the reflective layers 116. Hence, the liquid crystal layer 130 disposed between the pixel array substrate 110 and the opposite substrate 120 does not merely serve to add a thickness. As shown in FIG. 1, the reflective layers 116 arranged on the insulation layer 118 can serve to add a height, such that the transflective LCD panel 100 provided herein is a dual cell gap transflective LCD panel. Besides, the transflective LCD panel 100 provided herein further includes an optical adhesive layer 140 disposed between the color filter layer 124 and the liquid crystal layer 130 and between the light scattering layers 126 and the liquid crystal layer 130, so as to enhance the adhesion between the opposite substrate 120 and the liquid crystal layer 130.

As shown in FIG. 1, the thickness T1 of the color filter layer 124 is at least twice the thickness T2 of each of the light scattering layers 126, and the thickness T2 of each of the light scattering layers 126 is within a range from 1 μm to 10 μm, for instance. An orthogonal projection of each of the light scattering layers 126 on the first substrate 112 and an orthogonal projection of each of the reflective layers 116 on the first substrate 112 are completely overlapped. Preferably, an area of the orthogonal projection of each of the light scattering layers 126 on the first substrate 112 may be greater than or equal to an area of the orthogonal projection of each of the reflective layers 116 on the first substrate 112. According to the present embodiment, each of the light scattering layers 126 has a plurality of first regions A1 and a plurality of second regions A2, and the first regions A1 and the second regions A2 are alternately arranged. Reflective particles P are doped in each of the second regions A2, and a distribution ratio of the reflective particles P in each of the second regions A2 is within a range from 5% to 50%. The reflective particles P are not doped in the first regions A1, and thus the first regions A1 are deemed as the transparent regions; the second regions A1 in which the reflective particles P are doped are deemed as the reflective regions.

As shown in FIG. 1, if the light L1 enters the first regions A1 of the light scattering layers 126, the light L1 directly penetrates the light scattering layers 126, passes through the planar reflective layers 116, and is reflected to the second regions A2 of the light scattering layers 126. After the reflected light L1 is further reflected by the reflective particles P2 in the second regions A2, the scattered light L2 can be generated. The arrangement of the light scattering layers allows the light to be scattered in a specific direction, increases the utilization rate of the reflected light scattered at a large angle, and improves the overall reflection rate of the transflective LCD panel 100. Besides, the planar reflective layer 116 provided herein does not achieve any mirror effect during reflection. Here, a ratio of a width W1 of each of the first regions A1 to a width W2 of each of the second regions A2 is within a range from 0.1 to 20. Each of the reflective particles P is a spherical resin particle, a spherical metal particle, or a particle made of an organic-inorganic composite material, and a diameter D of each of the reflective particles P is within a range from 0.1 μm to 50 μm. Preferably, a surface S of each of the reflective particles P has a plurality of recess patterns C, and a diameter d of each of the recess patterns C is within a range from 0.01 μm to 5 μm, so as to enhance the reflective efficiency and light diffusibility of the reflective particles P. Note that the shape of the recess patterns C is not limited in the invention, and the recess patterns C may have a circular shape, an elliptic shape, a polygonal shape, or any other shape.

In addition, to improve the display quality of the transflective LCD panel 100, the transflective LCD panel 100 provided in the present embodiment may further include a first polarizer 150a and a second polarizer 150b. The first polarizer 150a is disposed on a bottom surface 112b of the first substrate 112 away from the liquid crystal layer 130, and the second polarizer 150b is disposed on a top surface 122a of the second substrate 122 away from the liquid crystal layer 130. The first polarizer 150a and the second polarizer 150b are arranged for enhancing the light filtering performance and reducing crosstalk.

To sum up, the light scattering layers provided herein replace the existing concave-convex metal reflective layer. Here, the light scattering layers are disposed on the second substrate of the opposite substrate, the second bottom surface of each of the light scattering layers is aligned to the first bottom surface of the color filter layer, and the light scattering layers correspond to the reflective layers. Hence, the transflective LCD panel is a dual cell gap transflective LCD panel. The design of the light scattering layers allows the light beam to be scattered in a specific direction; thereby, the reflective layers provided herein can be planarized and do not achieve the mirror effect during reflection, the utilization rate of the reflected light scattered at a large angle can be increased, the reflective efficiency of the transflective LCD panel can be improved, and the transflective LCD panel provided herein can have favorable optical performance.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A transflective liquid crystal display panel comprising:
   a pixel array substrate comprising a first substrate, a plurality of pixel units, and a plurality of reflective layers, the pixel units and the reflective layers being disposed on the first substrate, wherein each of the pixel units has a transmissive region and a reflective region, and the reflective layers are disposed in the reflective region;
   an opposite substrate disposed above the pixel array substrate and comprising a second substrate, a color filter layer, and a plurality of light scattering layers, the color filter layer and the light scattering layers being disposed on the second substrate and facing the pixel units, wherein a thickness of the color filter layer is greater than a thickness of each of the light scattering layers, a first bottom surface of the color filter layer is aligned to a second bottom surface of each of the light scattering layers, and the light scattering layers correspond to the reflective layers; and
   a liquid crystal layer disposed between the pixel array substrate and the opposite substrate,
   wherein each of the light scattering layers has a plurality of first regions and a plurality of second regions, the first regions and the second regions are alternately arranged, reflective particles are doped in each of the second regions, a distribution ratio of the reflective particles in each of the second regions is within a range from 5% to 50%, and the first regions are transparent regions without doped with a reflective particle.

2. The transflective liquid crystal display panel of claim 1, wherein the pixel array substrate further includes an insulation layer disposed between the first substrate and the reflective layers and between the first substrate and the liquid crystal layer.

3. The transflective liquid crystal display panel of claim 1, further comprising:
   an optical adhesive layer disposed between the color filter layer and the liquid crystal layer and between the light scattering layers and the liquid crystal layer.

4. The transflective liquid crystal display panel of claim 1, wherein an orthogonal projection of each of the light scattering layers on the first substrate and an orthogonal projection of each of the reflective layers on the first substrate are completely overlapped.

5. The transflective liquid crystal display panel of claim 1, wherein the thickness of the color filter layer is at least twice the thickness of each of the light scattering layers.

6. The transflective liquid crystal display panel of claim 1, wherein a ratio of a width of each of the first regions to a width of each of the second regions is within a range from 0.1 to 20.

7. The transflective liquid crystal display panel of claim 1, wherein each of the reflective particles is a spherical resin particle, a spherical metal particle, or a particle made of an organic-inorganic composite material.

8. The transflective liquid crystal display panel of claim 7, wherein a diameter of each of the reflective particles is within a range from 0.1 µm to 50 µm, a surface of each of the reflective particles has a plurality of recess patterns, and a diameter of each of the recess patterns is within a range from 0.01 µm to 5 µm.

9. The transflective liquid crystal display panel of claim 1, further comprising:
   a first polarizer disposed on a bottom surface of the first substrate away from the liquid crystal layer; and
   a second polarizer disposed on a top surface of the second substrate away from the liquid crystal layer.

* * * * *